Dec. 5, 1967 W. D. WEEKS 3,355,825
BLADE POSITION LOCK AND RELEASE SYSTEM FOR ROAD SCRAPERS
Filed May 12, 1965 2 Sheets-Sheet 1
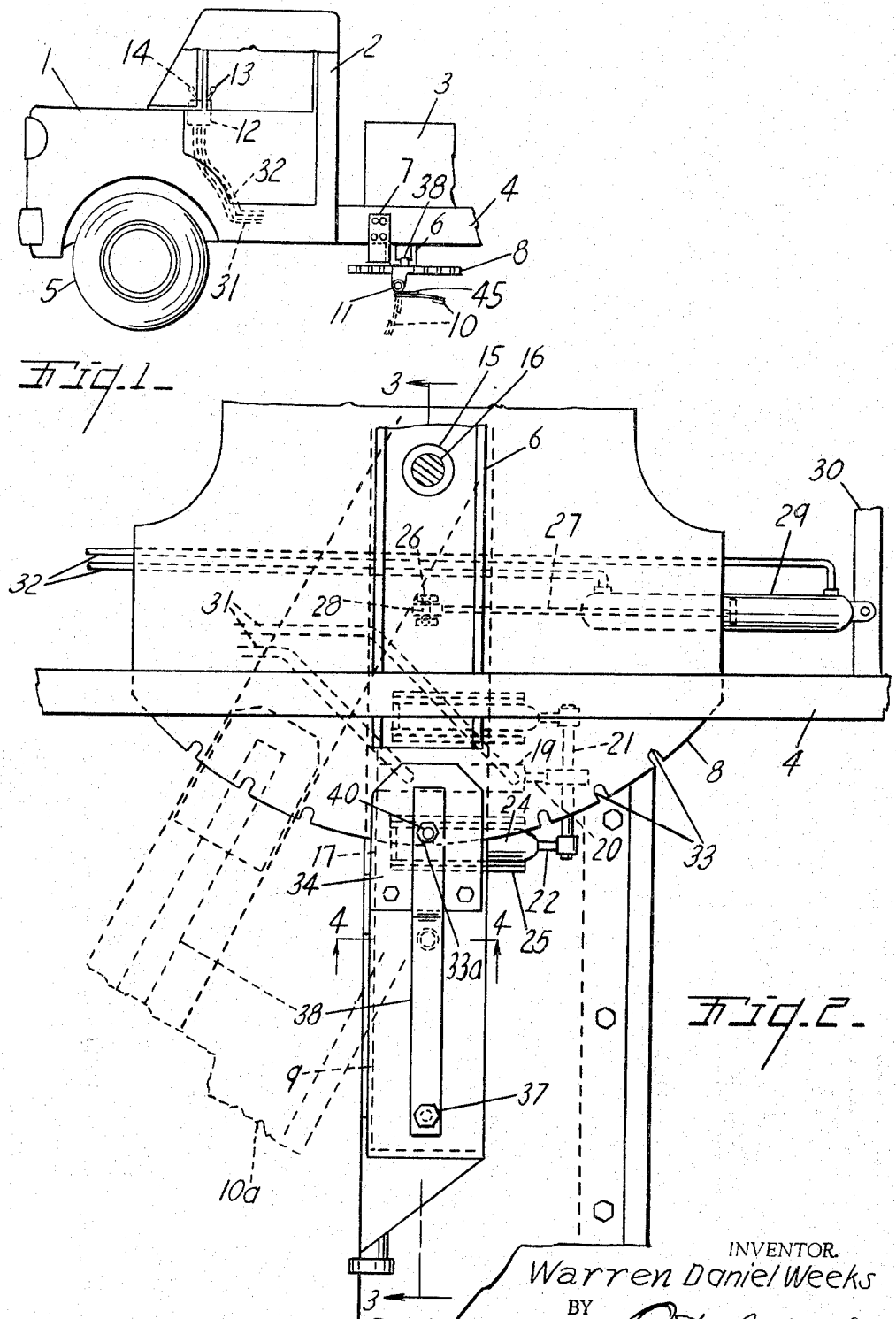
INVENTOR.
Warren Daniel Weeks
BY
ATTORNEY.

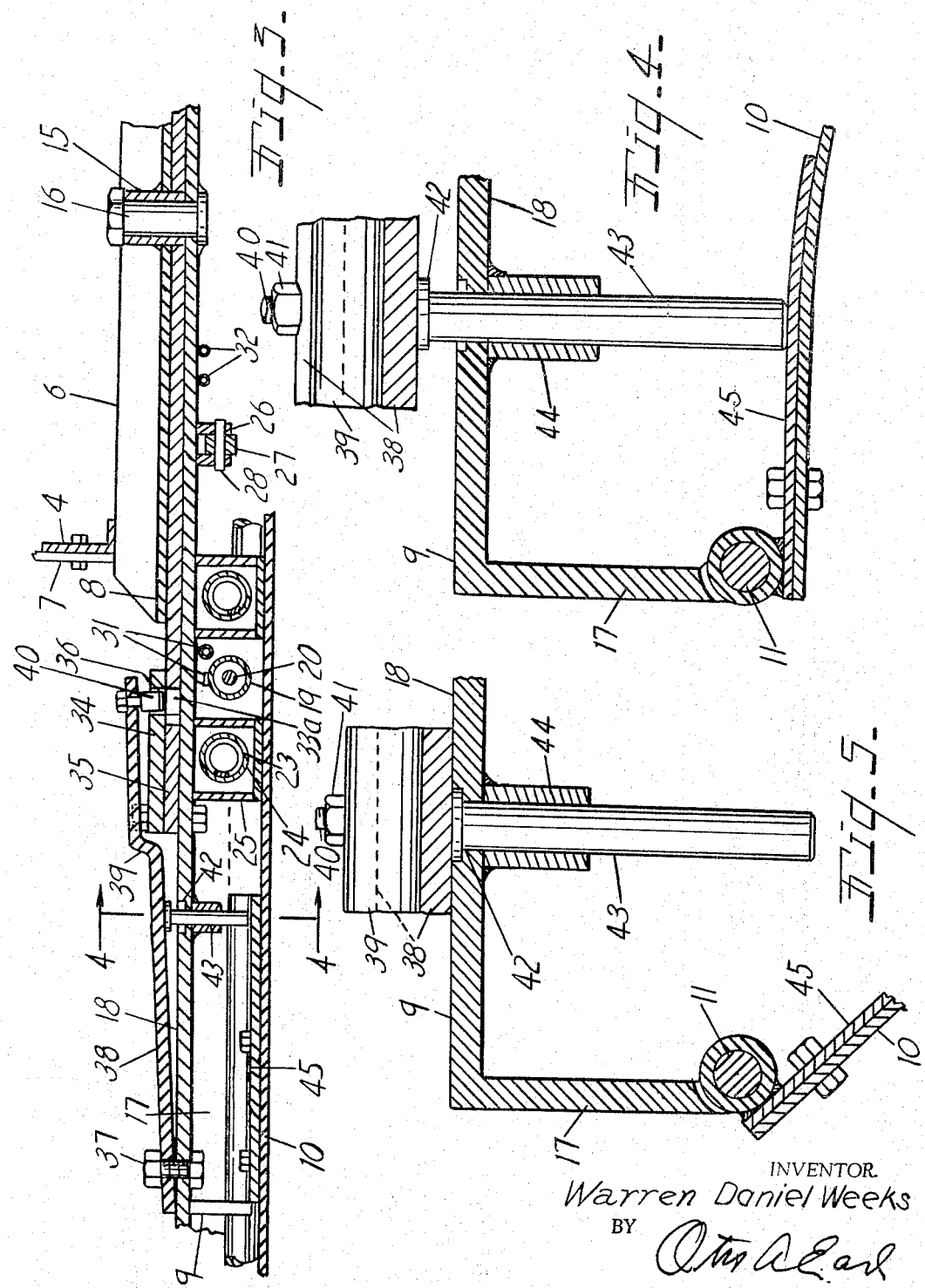

United States Patent Office 3,355,825
Patented Dec. 5, 1967

3,355,825
BLADE POSITION LOCK AND RELEASE SYSTEM FOR ROAD SCRAPERS
Warren Daniel Weeks, Kalamazoo, Mich., assignor to Root Spring Scraper Company, Kalamazoo, Mich.
Filed May 12, 1965, Ser. No. 455,240
6 Claims. (Cl. 37—42)

ABSTRACT OF THE DISCLOSURE

A truck having a horizontal sector plate mounted on its underside, said sector plate having locating notches spaced around its periphery, a blade support beam horizontally pivoted on the sector plate, a blade having its upper edge horizontally pivoted on said beam, hydraulic cylinders mounted on the beam and connected to swing the blade vertically, another hydraulic cylinder mounted on the truck and connected to swing the beam and blade horizontally, arcuate retaining plates secured to said beam in overlying relation to the edge of the sector plate and the locating notches therein and having holes movable with the beam into successive registry with the locating notches in the sector plate, leaf springs each having one end secured to the beam and springable ends overlying the holes in the retaining plates, locating pins carried by the springable ends of the leaf springs registering with the holes in the retaining plates and spring urged by the springs into engagement with the notches in the sector plate, and vertically movable pins carried by the beam with heads located in lifting relation to intermediate portions of the leaf springs and lower ends positioned to be raised by engagement with the blade in the raised position of the blade, the hydraulic cylinders having controls positioned in the cab of the truck.

---

This invention relates to improvements in blade position lock and release system for road scrapers. The principal objects of this invention are:

First, to provide a road scraper mount and control system which will permit the scraper blade to be positively locked in various horizontally rotated positions and unlocked for movement between adjusted positions entirely from the cab of the truck on which the scraper is mounted by utilizing existing controls for manipulation of the scraper blade.

Second, to provide a scraper blade position lock which releases automatically when the blade is adjusted to raised position and which is relocked when the blade is lowered in any of the predetermined horizontally adjusted positions of the blade.

Third, to provide a spring pressed lock for holding a scraper blade in various horizontally adjusted positions which will snap into place when the blade reaches one of the adjusted positions.

Fourth, to provide a scraper blade lock which is simple and inexpensive to manufacture and automatic and positive in operation so that the driver cannot forget to operate the lock while operating a truck carrying the scraper in either operative or inoperative positions of the scraper.

Other objects and advantages of the invention will be apparent from a consideration of the following description and claims. The drawings, of which there are two sheets, illustrate a highly practical form of the scraper blade lock of the invention and a conventional mounting of the blade and its control system on a truck.

FIG. 1 is a fragmentary side elevational view showing the scraper blade of the invention mounted on a truck and conventionally illustrating the controls for manipulating the position of the scraper blade.

FIG. 2 is a fragmentary top plan view of a portion of the truck frame and the mounting of the scraper blade, blade position controls and the lock of the invention.

FIG. 3 is a fragmentary vertical cross sectional view taken along the plane of the line 3—3 in FIG. 1.

FIG. 4 is a fragmentary transverse cross sectional view through the blade position lock taken along the plane of the line 4—4 in FIGS. 2 and 3.

FIG. 5 is a fragmentary transverse cross sectional view similar to FIG. 4 but showing the lock actuating mechanism and blade in locked operative position of the blade.

Trucks equipped with scraper blades for conditioning the surface of roads for grading or for snow removal are common and in FIG. 1 there is more or less conventionally illustrated a truck 1 having a driver's cab 2, body 3 and horizontal frame members 4. Mounted behind the front wheels 5 on the underside of the frame members 4 is a transversely extending blade mounting beam 6 secured to the vehicle frame as by the mounting plate 7. It will be understood that the plate 7 is duplicated on the opposite side of the vehicle. The mounting beam 6 carries a generally horizontal sector plate 8. The sector plate 8 horizontally swingably supports a blade support beam 9 to which the scraper blade 10 is pivotally connected by a pivot 11. The cab contains a hydraulic control system indicated conventionally at 12 with a control 13 for adjusting the horizontal angle position of the scraper blade and a control 14 for adjusting the vertical position of the scraper blade 10.

As appears more clearly from FIGS. 2 and 3 the sector plate 8 and mounting beam 6 carry a central pivot bearing 15 which receives the pivot pin 16 for horizontally swingably supporting the blade support beam 9 on the underside of the sector plate. The support beam 9 has a depending forward flange 17 that is suitably braced to its upper flange 18 and which carries the fixed knuckles of a hinge-like support for the blade pivot 11. A first horizontal hydraulic cylinder 19 abuts against the rear of the front flange 17 and has a rearwardly extending piston rod 20 connected to a cross pin 21 between two blade tilting rods 22 which operate through springs 23 in the housing 24 to adjust the position of the blade by pressing on brackets 25 secured to the blade and movably pivoted on the pivot 11. It will be understood that the cylinder 19 is commonly duplicated on the other side of the blade and vehicle.

The blade support beam further carries a depending yoke 26 to which the forward end of a piston rod 27 is connected by the pin 28. The piston rod 27 operates in the cylinder 29 which is anchored to a cross frame element 30 of the truck to swing the blade support beam about its central pivot 16. Hydraulic connections 31 extend from opposite ends of the cylinders 19 to the control 14 while conduits 32 extend from opposite ends of the cylinder 29 to the control 13. The foregoing blade mounting and adjusting mechanism is old and is accordingly not described in greater detail.

The lock mechanism of the invention is applied to and cooperates with the previously described mounting and controls as follows. The periphery of the sector plate 8 is provided with a series of positioning notches or detent openings 33. Usually there are two or three detents for angularly adjusted positions of the scraper ahead of and behind a central notch or detent 33A which located the scraper in straight crosswise position illustrated. An angularly adjusted position of the scraper is indicated by the dotted lines at 10A in FIG. 2. Secured to the top of the blade support beam 9 on each side of the sector plate 18 are retaining plates 34 mounted on lift plates or blocks 35 so that the retaining plates project over the periphery of the sector plate and the detent notches 33. The retaining plates define holes or keeper openings 36 which move with the scraper into registry with the several notches 33 and 33A. Secured to the top of the blade support beam 9 by the bolt 37 is a stiff leaf spring 38 having an upward off-set 39 to extend along the top of the retaining plate 34. Again the leaf spring 38 is duplicated on the opposite side of the scraper support beam. The free springable end of the spring 38 carries a depending lock pin 40 secured by the nut 41 in vertically movable relation through the keeper opening 36 in the retaining plate.

Positioned underneath the left spring 38 and in spaced relationship to its mounting bolt 37 is a shouldered hole or opening 42 passing a freely slidable headed release pin 43 which projects downwardly into the path of vertical swinging motion of the blade 10 in rearwardly spaced relation from the pivot 11 of the scraper. Desirably a guide sleeve 44 for the pin 43 is welded to the underside of the top flange 18 of the support beam 9.

In operation of the scraper blade and lock mechanism, raising of the blade 10 about the pivot 11 by means of the cylinders 19 and control 14 brings the back surface of the blade or one of its mounting brackets 45 into upwardly displacing engagement with the pin 43 so that the head of the pin lifts the spring 38 thereby withdrawing the locking pin 40 from the notch or detent in which it may be engaged. The scraper support beam 9 is then free to be turned to any horizontally angularly adjusted position by actuation of the cylinder 29 and the control 13. When the blade is in or near its newly adjusted position the control 14 is reversed to lower the blade and permit the spring 38 to force the lock pin 40 downwardly to the newly selected locating detent 30. It will be noted that the scraper support beam need not be in perfect registery with a notch 33 before the blade is lowered as the pin 40 will slide along the top surface of the sector plate until it drops into the selected notch 30. It should be pointed out that the downward adjustment of the scraper blade 10 which is necessary to permit retraction of the spring 38 and movement of the lock pin toward locked position is only part of the total vertical adjustment of the blade 10 so that the blade locking mechanism is operative in all angularly adjusted positions of the blade support beam while the blade itself is still raised out of road engaging or operating position. Once the support beam is locked in the desired angularly adjusted position the operator can further actuate the blade lowering control 14 to force the blade downwardly to scraping position and can also raise the blade out of road scraping position without releasing the horizontal position lock of the blade support beam.

What is claimed as new is:

1. A road scraper blade lock and control comprising,
a sector plate adapted to be mounted in a horizontal position under a truck and having angularly spaced locating notches in its opposite edges,
a blade support beam horizontally pivotally connected to the mid-section of said sector plate and projecting beyond the ends thereof,
a scraper blade having its upper edge vertically pivotally connected to the lower edge of said beam,
a first hydraulically actuated means connected to said blade and adapted to be connected to the truck to swing said blade vertically about its pivot,
a second hydraulically actuated means connected to said beam and adapted to be connected to the truck to swing said beam horizontally about its pivot,
retaining plates carried on the top of said beam in overlapping relation to the opposite edges of said sector plate and the locating notches therein,
leaf springs fixedly secured to the top of said beam outwardly of said retaining plates and having inner springable ends extended in upwardly off-set relation over said retaining plates,
locking pins depending from the springable ends of said springs through holes provided therefor in said retaining plates into locking engagement in said notches,
upright guide sleeves secured to the bottom of said beam in spaced relation to the pivot of said blade and over the raised position of the blade,
and headed push pins vertically reciprocably received through holes in said beam and extending through said guide sleeves beyond the raised position of said blade,
said push pins being located under said leaf springs in spaced relation to the fixed ends of the springs whereby raising said blade by said first hydraulic means raises said push pins and said leaf springs to disengage said locking pins from said notches in said sector plate.

2. A road scraper blade lock and control comprising,
a sector plate adapted to be mounted in a horizontal position under a truck and having angularly spaced locating detents along its opposite edges,
a blade support beam horizontally pivotally connected to the mid-section of said sector plate and projecting beyond the ends thereof,
a scraper blade having its upper edge vertically pivotally connected to said beam,
a first hydraulically actuated means connected to said blade and adapted to be connected to the truck to swing said blade vertically about its pivot,
a second hydraulically actuated means connected to said beam and adapted to be connected to the truck to swing said beam horizontally about its pivot,
retaining plates carried on said beam in overlapping relation to the opposite edges of said sector plate and the locating detents therein,
leaf springs fixedly secured to said beam outwardly of said retaining plates and having inner springable ends,
locking pins carried by the springable ends of said springs and extending through holes provided therefor in said retaining plates into locking engagement in said detents,
upright guide means in said beam in spaced relation to the pivot of said blade and over the raised position of the blade,
and push pins vertically reciprocably received and extending through said guide means beyond the raised position of said blade,
said push pins being located under said leaf springs in spaced relation to the fixed ends of the springs whereby raising said blade by said first hydraulic means raises said push pins and said leaf springs to disengage said locking pins from said detents in said sector plate.

3. Lock and release means for a road scraper having a supporting sector plate, a horizontally swingable blade support beam and a vertically swingable blade mounted on the beam comprising,
a springable element carried by said beam,
a lock pin carried by said springable element and projectable thereby into locking engagement with said sector plate,
a guide and keeper means for said locking pin fixed relative to said beam,
and a spring retracting element movably mounted on said beam and engageable between said blade in the raised position of said blade and said springable element to retract the springable element and said pin from engagement with said sector plate.

4. Lock and release means as defined in claim 3 in which the elements defined are duplicated at opposite sides of the sector plate on opposite ends of the beam.

5. Lock and release means as defined in claim 3 in which the springable element is a bar spring and said lock pin is secured to a springable portion thereof.

6. Lock and release means as defined in claim 5 in which said bar spring is disposed in horizontal position on said blade support beam with its free end in overlapping relation to said sector plate.

References Cited

UNITED STATES PATENTS

| | | | |
|---|---|---|---|
| 1,844,058 | 2/1932 | Dean | 37—155 |
| 1,858,214 | 5/1932 | Weeks. | |
| 1,865,587 | 7/1932 | Price | 37—155 |
| 3,086,303 | 4/1963 | Weeks | 37—42 |

ABRAHAM G. STONE, *Primary Examiner.*

R. L. HOLLISTER, *Assistant Examiner.*